United States Patent
Nerlikar et al.

(10) Patent No.: US 11,197,131 B2
(45) Date of Patent: Dec. 7, 2021

(54) SYSTEM AND METHOD FOR VARIABLE LENGTH TALK PERMIT TONE

(71) Applicant: MOTOROLA SOLUTIONS, INC., Chicago, IL (US)

(72) Inventors: Rohit A Nerlikar, Plano, TX (US); Brahmananda R Vempati, Dallas, TX (US); Bidhudatta Biswal, Richardson, TX (US); Ramu Kandula, McKinney, TX (US); Harisha Negalaguli, McKinney, TX (US); Basem A Ardah, Plano, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/710,344

(22) Filed: Dec. 11, 2019

(65) Prior Publication Data

US 2021/0185489 A1 Jun. 17, 2021

(51) Int. Cl.
*H04B 7/00* (2006.01)
*H04W 4/10* (2009.01)
*H04W 4/24* (2018.01)
*H04M 15/00* (2006.01)
*H04W 76/45* (2018.01)

(52) U.S. Cl.
CPC ............ *H04W 4/10* (2013.01); *H04M 15/66* (2013.01); *H04W 4/24* (2013.01); *H04W 76/45* (2018.02)

(58) Field of Classification Search
CPC ......... H04W 4/10; H04W 4/24; H04W 76/40; H04W 76/45; H04W 4/20; H04W 4/50; H04W 76/10; H04M 15/56; H04M 15/66; H04M 15/8033; H04M 15/8351; H04M 15/83; H04M 15/858; H04L 65/00; H04L 65/1016; H04L 65/4046; H04L 65/4061
See application file for complete search history.

(56) References Cited

U.S. PATENT DOCUMENTS

| | | | |
|---|---|---|---|
| 7,245,940 B2 | 7/2007 | Serbin et al. | |
| 8,055,290 B1* | 11/2011 | Cai | H04W 76/45 455/518 |
| 2004/0127233 A1* | 7/2004 | Harris | H04W 4/10 455/458 |
| 2006/0019681 A1* | 1/2006 | Harris | H04W 72/121 455/464 |
| 2006/0046697 A1* | 3/2006 | Koren | H04W 4/10 455/412.2 |
| 2006/0121888 A1* | 6/2006 | Harris | H04W 4/10 455/414.1 |
| 2006/0172752 A1 | 8/2006 | Harris et al. | |
| 2007/0047515 A1* | 3/2007 | Jonsson | H04L 49/901 370/352 |
| 2007/0281723 A1* | 12/2007 | Chotai | H04L 65/4061 455/518 |

(Continued)

*Primary Examiner* — Tuan Pham

(57) ABSTRACT

Techniques for variable length talk permit tone are provided. a request to initiate a Push-to-Talk (PTT) call may be received from a PTT call initiator. A first estimated length of time needed to set up resources for the PTT call may be determined. A second length of time to playout a talk permit tone (TPT) may be determined based on the determined first estimated length of time. An indication may be sent to the PTT call initiator to playout the TPT for the determined second length of time.

20 Claims, 6 Drawing Sheets

(56) References Cited

U.S. PATENT DOCUMENTS

| | | | |
|---|---|---|---|
| 2010/0248770 A1* | 9/2010 | Shuman | H04W 4/10 |
| | | | 455/518 |
| 2012/0275300 A1* | 11/2012 | Munoz de la Torre Alonso | |
| | | | H04L 67/16 |
| | | | 370/229 |
| 2015/0195746 A1* | 7/2015 | Franklin | H04N 21/238 |
| | | | 370/230 |

* cited by examiner

SYSTEM AND METHOD FOR VARIABLE LENGTH TALK PERMIT TONE

BACKGROUND

Push-to-Talk (PTT) over Cellular (PoC) systems allow users to have walkie-talkie like functionality through a cellular device (e.g. smartphone, etc.). In typical operation, a set of users will establish a group, often referred to as a talk group, for two-way, half-duplex communications between members of the group. Each member of the group may have a PTT client application installed on their cellular device that facilitates this communication.

In operation, a user who wishes to communicate with the group may press a PTT "button" on his cellular device. In some implementations, the button may be a physical button on the cellular device while in other implementations, the button may be a "soft" button displayed on the screen of the cellular device. Once pressed, the PoC system may establish half duplex calls with each member of the talk group. The call originator receives a Talk Permit Tone (TPT), which may sometimes be referred to as a talk permit "chirp." Once the TPT has been played, this indicates the call originator has acquired the floor, and may begin speaking. The call originator's voice communication may then be sent to other members of the talk group.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
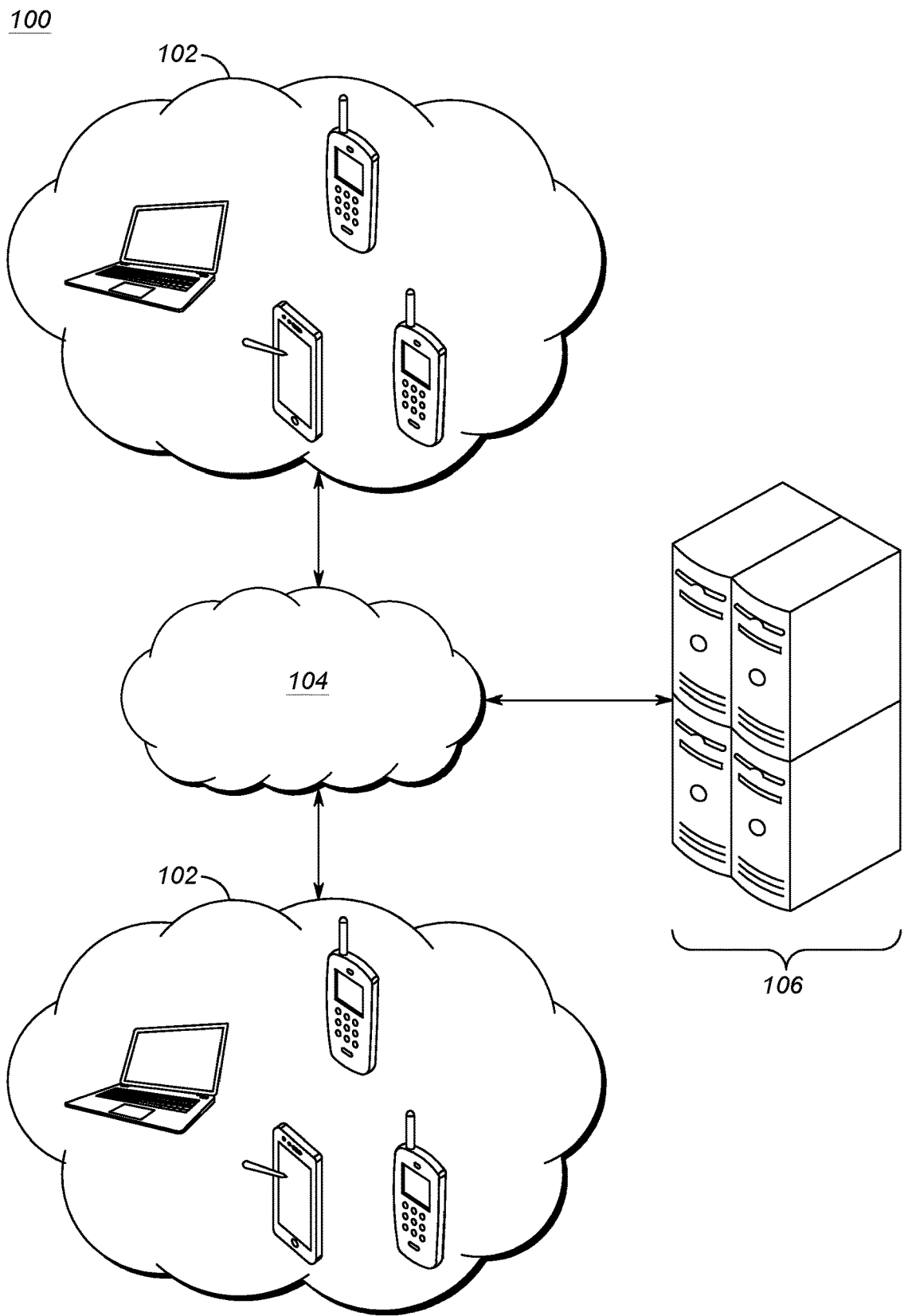
FIG. 1 is a diagram of an example system that may implement the variable length talk permit tone techniques described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

PoC systems allow users to have many of the same functionalities of dedicated Land Mobile Radio (LMR) PTT systems (e.g. P25 systems, Tetra Systems, etc.) while not requiring the user to carry a dedicated LMR device. Furthermore, because the PoC systems rely on cellular infrastructure, an organization that wishes to use PoC need not invest in/maintain dedicated LMR radio access networks (RAN). In addition, organizations such as the $3^{rd}$ Generation Partnership Project (3GPP) have defined various PTT standards that are designed to promote compatibility of PoC devices/client applications that are provided by different vendors. 3GPP has identified several Key Process Indicator(s) (KPI(s)) and other requirements that are the basis for determining if a device/client application is compliant with the 3GPP Mission Critical (MC) PoC standards (3GPP MCPTT). Some of these KPIs are based on ensuring a satisfactory user experience.

One example of such a KPI is the time from PTT button press to PTT grant (e.g. floor grant). For example, KPI-1 currently requires that the PTT grant is to be received within 300 msec of pressing the PTT button. The PTT grant is what triggers playout of the TPT. Once the TPT has completed, the user may begin speaking. Users have come to expect the TPT playout to begin shortly after pressing the PTT button. Delays in playing out the TPT may degrade the user experience, as they user may not be sure that the request to initiate a PTT call has been received and is being acted upon. The playout of the TPT within a relatively short period of time after pressing the PTT button assures the user that the call is in progress. Although KPI-1 has been mentioned, it should be understood that this is simply an example.

Another constraint imposed by the 3GPP MCPTT standards is that in a group call, all call recipients must receive the entirety of the voice communication without any clipping of audio (e.g. every recipient must receive the entirety of the call originators audio, without omission). Because PoC systems utilize cellular infrastructure, contacting each call recipient's device to set up the call involves paging, and the paging response time of each device may be variable. In order to meet the no clipping requirement, a PoC system may buffer the call originator's audio until all call recipients have connected to the call. Once all call recipients have connected, the buffered audio may be sent. This ensures that there is no audio clipping, because the audio is not sent to any recipient until all recipients have joined the call.

The two requirements described above create several problems. For example, a call originator, before pressing the PTT button on his device, will generally be connected to a PoC server on a default bearer channel. A default bearer channel is a "best effort" channel without a guaranteed bit rate and as such provides no guaranteed quality of service (QoS) levels or even a guarantee that any transmission will ever arrive at the PoC server. As part of the process of setting up a PTT call, the PoC server may cause the establishment of a dedicated bearer to the call originator device. A dedicated bearer may provide a guaranteed QoS level, thus ensuring any transmission will arrive at the destination. It is possible that the setup of the dedicated bearer is not complete before the PTT grant is sent. The call originator may then begin speaking once the TPT completes, but because his audio is going over the default bearer, there is no guarantee that it will ever arrive at the PoC server.

As additional problem is created with respect to call recipients. The PoC system must buffer the audio from the call originator until all call recipients (e.g. all call termination legs) have connected to the PoC server and are ready to receive audio. The amount of time this takes may be highly variable. First, group calls may have hundreds if not thousands of participants and setting up all those terminating call legs may take time. Furthermore, even in small group calls, if only a single call termination leg takes a long time to set up, the audio must be buffered until the lagging termination leg has finished setting up. The amount of audio that must be buffered is dependent on the longest call terminator setup time and/or the overall number of call termination legs. Buffering audio cause significant use of limited resources, such as memory. The less audio that needs to be buffered, the better.

The techniques described herein overcome these problems and others, individually and collectively. In one aspect, when a new group call is initiated, a PoC server (e.g. MCPTT Server) may estimate how long it will take for the dedicated bearer to the call originator to be set up. If the setup time is less than the required time to send the PTT grant as dictated by the 3GPP MCPTT standard, a PTT grant is sent including a parameter that indicates a standard length TPT should be played out. However, if the estimated time to set up the dedicated bearer exceeds the maximum allowed time for sending the PTT grant, the parameter in the PTT grant will indicate that the TPT should be played out for an extended period of time. The length of the extended period of time is based on the estimated time to set up the dedicated bearer. In other words, the length of the TPT is variable such that when the TPT has completed playout, sufficient time has elapsed for setup of the dedicated bearer.

In another aspect, when a new call is originated, the PoC server may determine the expected amount to time required to establish all call termination legs. The PTT grant may include a parameter that indicates how long the TPT should be played out. The parameter may be determined based on the expected time to establish all call termination legs. Thus, by the time TPT has completed playout, all terminating call legs have been established.

The two aspects described above were described separately for ease of understanding. Each aspect could be implemented independently. In some implementations, both aspects may be considered together. The aspect that results in the longer TPT playout time may be sent to the originating device in the PTT grant. As such, the TPT playout will not end until all necessary resources (e.g. dedicated bearer, all call termination legs connected, etc.) have been established.

Users are already trained to not begin speaking until the TPT has completed playout. In fact, trying to speak over the TPT would likely seem very unnatural. In the first aspect, because the TPT tone plays until the dedicated bearer is expected to be set up, there is no longer a concern that the call originators audio would be sent over the default bearer. Likewise, in the second aspect, because the TPT will continue to play out until all the terminating call legs are connected, there is no need to buffer audio, as the call originator will not begin speaking until the TPT playout has completed.

Although the user may notice that the TPT playout may take longer to complete, it is expected that the length will only increase within the range of hundreds of milliseconds. As such, the increased time to playout the TPT is likely to not adversely impact user experience.

A method is provided. The method may comprise receiving a request to initiate a Push-to-Talk (PTT) call from a PTT call initiator. The method may further comprise determining a first estimated length of time needed to set up resources for the PTT call. The method may further comprise determining a second length of time to playout a talk permit tone (TPT) based on the determined first estimated length of time. The method may further comprise sending an indication to the PTT call initiator to playout the TPT for the determined second length of time.

In one aspect, the first estimated length of time is longer than the second length of time. In one aspect, determining the first estimated length of time may further comprise determining an estimated length of time needed to set up a dedicated bearer to the PTT call initiator. In one aspect, determining the estimated length of time needed to set up the dedicated bearer to the PTT call initiator may further comprise monitoring an average response time of a Policy Charging and Rules Function (PCRF) transaction and basing the estimated length of time needed to set up the dedicated bearer on the average response time.

In one aspect, determining the estimated length of time needed to set up the dedicated bearer to the PTT call initiator may further comprise determining a busy hour response time of a Policy Charging and Rules Function (PCRF) transaction and basing the estimated length of time needed to set up the dedicated bearer on the busy hour response time. In one aspect, determining the first estimated length of time may further comprise determining an estimated length of time needed to set up at least one call termination leg. In one aspect, determining the first estimated length of time may further comprise determining an estimated length of time needed to set up all call termination legs.

A system is provided. The system may include a processor and a memory coupled to the processor. The memory may contain thereon a set of instructions that when executed by the processor cause the processor to receive a request to initiate a Push-to-Talk (PTT) call from a PTT call initiator. The instructions may further cause the processor to determine a first estimated length of time needed to set up resources for the PTT call. The instructions may further cause the processor to determine a second length of time to playout a talk permit tone (TPT) based on the determined first estimated length of time. The instructions may further cause the processor to send an indication to the PTT call initiator to playout the TPT for the determined second length of time.

In one aspect, the first estimated length of time is longer than the second length of time. In one aspect, the instructions to determine the first estimated length of time may further cause the processor to determine an estimated length of time needed to set up a dedicated bearer to the PTT call initiator. In one aspect, the instructions to determine the estimated length of time needed to set up the dedicated bearer to the PTT call initiator may further comprise instructions to monitor an average response time of a Policy Charging and Rules Function (PCRF) transaction and base the estimated length of time needed to set up the dedicated bearer on the average response time.

In one aspect, the instructions to determine the estimated length of time needed to set up the dedicated bearer to the PTT call initiator may further comprise instructions to determine a busy hour response time of a Policy Charging and Rules Function (PCRF) transaction and base the estimated length of time needed to set up the dedicated bearer on the busy hour response time. In one aspect the instructions to determine the first estimated length of time may further comprise instructions to determine an estimated length of time needed to set up at least one call termination leg. In one aspect the instructions to determine the first estimated length of time may further comprise instructions to determine an estimated length of time needed to set up all call termination legs.

A non-transitory processor readable medium containing a set of instructions thereon is provided. When executed by a processor the instructions may cause the processor to receive a request to initiate a Push-to-Talk (PTT) call from a PTT call initiator. The instructions may further cause the processor to determine a first estimated length of time needed to set up resources for the PTT call. The instructions may further cause the processor to determine a second length of time to playout a talk permit tone (TPT) based on the determined first estimated length of time. The instructions may further cause the processor to send an indication to the PTT call initiator to playout the TPT for the determined second length of time.

In one aspect, the instructions contained on the medium may further cause the processor to determine an estimated length of time needed to set up a dedicated bearer to the PTT call initiator. In one aspect, the instructions contained on the medium to determine the estimated length of time needed to set up the dedicated bearer to the PTT call initiator may further comprise instructions to monitor an average response time of a Policy Charging and Rules Function (PCRF) transaction and base the estimated length of time needed to set up the dedicated bearer on the average response time.

In one aspect, the instructions contained on the medium to determine the estimated length of time needed to set up the dedicated bearer to the PTT call initiator may further comprise instructions to determine a busy hour response time of a Policy Charging and Rules Function (PCRF) transaction and base the estimated length of time needed to set up the dedicated bearer on the busy hour response time. In one aspect, the instructions contained on the medium to determine the first estimated length of time may further comprise instructions to determine an estimated length of time needed to set up at least one call termination leg. In one aspect, the instructions contained on the medium to determine the first estimated length of time may further comprise instructions to determine an estimated length of time needed to set up all call termination legs.

FIG. 1 is a diagram of an example system that may implement the variable length talk permit tone techniques described herein. FIG. 1 illustrates a communications system 100, which provides an architecture for supporting a PTT communications solution that may utilize the techniques described herein. Communications system 100 includes client devices 102, a communications network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices.

In an embodiment where PTT platform 106 is a PTT-over-Cellular (PoC) platform, subscribers to a PTT solution (e.g., users operating client devices 102) may be provisioned onto communications system 100 via interfaces to carriers (e.g., cellular carriers). PTT customers (e.g., enterprises) can administer these subscribers to form closed groups, which may be referred to as talk groups, for PTT communications. The PTT solution may interface with the carrier, for example, by including connectivity to the carrier's core network, billing interfaces, provisioning interfaces, lawful intercept interfaces, customer care interfaces, and the like. PTT platform 106 may provide a plurality of PTT functions to client devices 102 through the PTT clients on client devices 102 as described in greater detail below.

Applications (referred to hereinafter as "PoC clients") reside on client devices 102 for accessing various PTT functions (also referred to as services) provided by PTT platform 106. Client devices 102 may communicate with PTT platform 106 over network 104, which may be accessed by client devices 102 through a cellular network deployed by a carrier, a WiFi network, a radio access network (RAN), other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., long term evolution (LTE), LTE advanced (LTE-A), High Speed Packet Access (HSPA), Wi-Fi 802.11a/b/g/n/ac, 3GPP, 3GPP MCPTT, etc. In some embodiments, network 104 may comprise various other devices, such as relays, low power nodes, etc. Network 104 may further include backhaul network components, such as various gateways, routers, controllers, schedulers, and the like. In some embodiments, the PTT platform 106 may support MCPTT as defined by 3GPP.

Figure 2A:
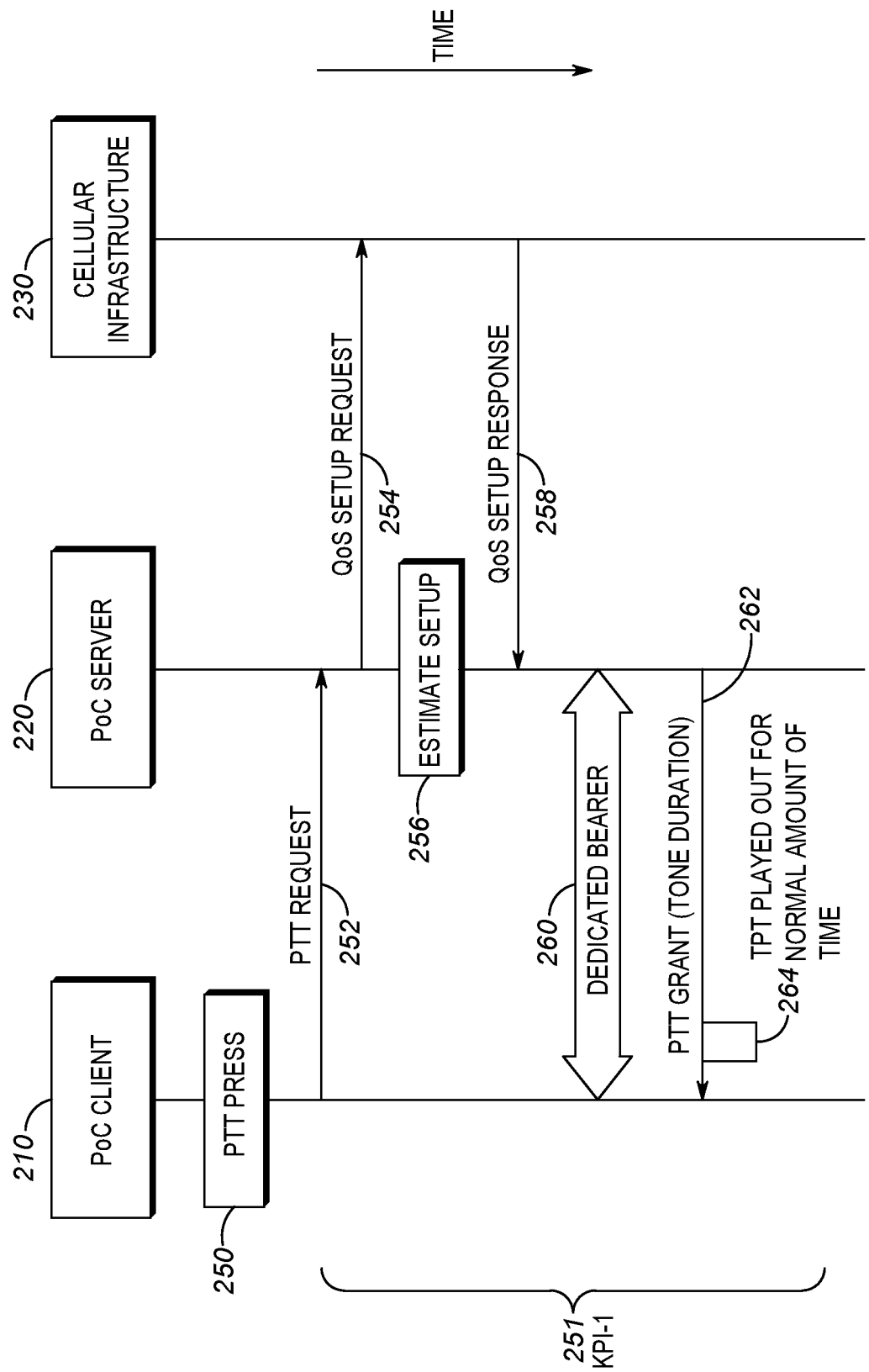
FIGS. 2(A,B) are an example of a call flow diagram for varying the length of a talk permit tone based on estimated time for dedicated bearer setup.

FIGS. 2(A,B) are an example of a call flow diagram for varying the length of a talk permit tone based on estimated time for dedicated bearer setup. FIG. 2A is an example of a call flow diagram when it is estimated that the dedicated bearer between the PoC Client and the PoC Server will be established within the time period allotted by KPI-1 for the PTT Grant to be sent to the client. The example flow diagram includes a PoC client 210, a PoC server 220, and cellular infrastructure 230.

The PoC Client 210 may be a dedicated, purpose built hardware device that supports PoC and operates on the cellular network. The device may include a physical hardware PTT button which may be utilized to initiate a PTT call. The PoC client may be a software application (e.g. app, etc.) that may run on a generic cellular device (e.g. smartphone, etc.). The techniques described herein are applicable to any client that conforms to the PoC based standards.

The PoC server 220 is depicted generically as a single server. However, it should be understood that the functionality provided by the PoC server may actually be provided by multiple servers. For example, in some implementations, there may be a PTT server that handles signaling traffic (e.g. SIP messaging, RTCP, etc.) while there is a PTT media server that handles the actual flow of PTT media (e.g. voice communications, video, etc.) over dedicated bearers. For purposes of ease of description, all functionality provided by a PoC system will be described as being provided by the PoC server.

Cellular infrastructure 230 is the infrastructure over which the PoC system runs. For example, the cellular infrastructure may provide a Radio Access Network (RAN) through which the device running PoC Client 210 may connect to the cellular system. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

In operation, the PoC Client 210 may wish to initiate a group call to other PoC clients (not shown). As the initial step, the user of the PoC Client may press the PTT button 250 on the PoC client to initiate a call to a talk group. As a result, this may cause a PTT request 252 to be sent to the PoC Server 220 requesting that the PoC Server to request that the PoC Server set up a call with the talk group. For purposes of ease of description, the actual specific messages sent between the PoC Client and Server have been omitted. In actual implementation, the PTT Request may include multiple messages (e.g. SIP Invite, SIP Ack, etc.) The techniques described herein are not dependent on the specific messages that are exchanged. Rather, what should be understood is that the PoC Client sends an indication to the PoC Server that it wishes to initiate a PTT call.

The act of pressing the PTT button may also cause the system to begin a timer related to compliance with the KPI-1 metric. As explained above, in order to be compliant with the 3GPP MCPTT standards, the PTT Grant (e.g. floor acquired) must occur before the timer defined by the KPI-1 metric expires.

The PoC Server 220 may then begin the process of setting up a dedicated bearer with a guaranteed QoS in order to ensure that the communications channel is able to guarantee that the PoC Client's 210 call is received by the PoC Server. The PoC Server may send a QoS setup request 254 to the cellular infrastructure with a request to set up a communications channel between the PoC Client and the PoC Server.

In the case where the cellular infrastructure 230 is an LTE system, the QoS setup request may involve sending a message to a Policy Charging and Rules Function (PCRF) (not shown) to set up a dedicated bearer. The PCRF may communicate with multiple elements within the LTE network (e.g. Policy and Charging Enforcement Function (PCEF), Packet Gateway (PGW), eNodeB, etc.) in order to establish the dedicated bearer with a guaranteed QoS. What should be understood is that the QoS setup request may take some period of time to complete.

The PoC Server 220 may estimate the time that it will take to setup dedicated bearer between the PoC Server and the PoC Client 210. This estimate can be conducted in any number of ways. For example, in one implementation, the PoC server may keep track of an average response time of the Cellular Infrastructure 230 to set up the dedicated bearer. In other implementations, the PoC server may monitor the Cellular Infrastructure response times for each hour of the day and assign an estimated response time for each hour. In other implementations, the maximum response time for each hour of the day may be used.

The particular techniques used to create generate the estimate of the time it will take to set up the dedicated bearer are generally not important. Any technique that can generate a suitable accurate estimate of dedicated bearer setup time may be used. Furthermore, although the example above is described in terms of an LTE system interacting with a PCRF, what should be understood is that the techniques described herein are not limited to an LTE system. The estimate 256 generated by the PoC server is simply the estimate of time for setting up a communications channel with a guaranteed QoS between the PoC Server 220 and the PoC Client.

In the example described in FIG. 2A, the Cellular Infrastructure 230 may send a QoS setup response 258 indicating the dedicated bearer 260 has been established between the PoC Client 210 and the PoC server 220 before the expiration of the timer 251. As such, the PTT Grant 262 can be sent to the PoC Client with an indication that the tone duration of the TPT playout should be unmodified (e.g. the same duration as it would be absent the current teachings).

The PoC client 210 may then cause the TPT to be played out 264 for the time duration specified in the PTT grant. Once the TPT completes playout, PoC Client user may begin speaking. Because the dedicated bearer has already been setup, there is no concern that the PoC Client user's speech will be transmitted over the default bearer. Furthermore, it should be clear that compliance with KPI-1 has been achieved.

Figure 2B:
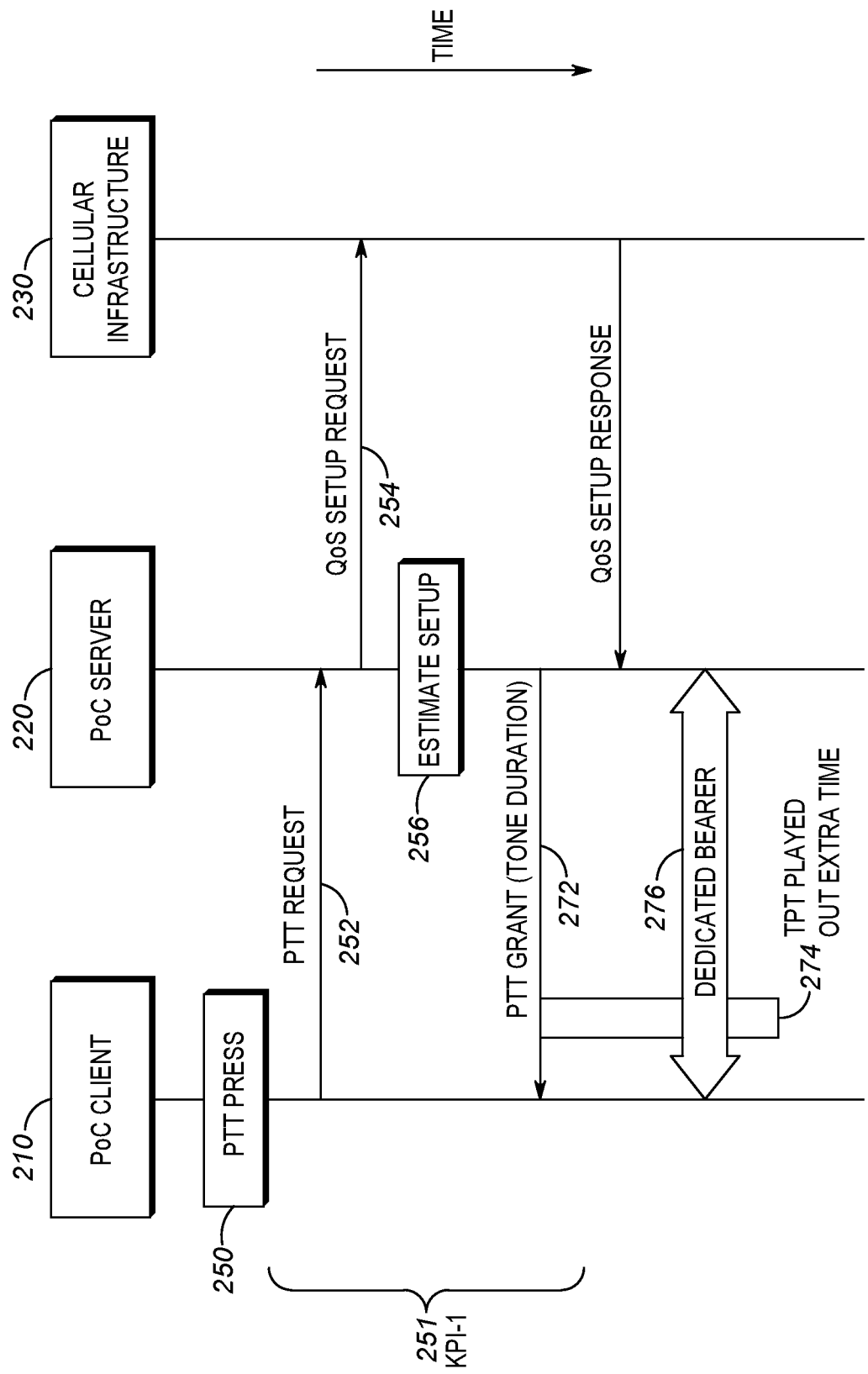

FIG. 2B is an example of a call flow diagram when it is estimated that the dedicated bearer between the PoC Client and the PoC Server will be established after the time period allotted by KPI-1 for the PTT Grant to be sent to the client. The call flow diagram depicted in FIG. 2B is the same as that depicted in FIG. 2A until the step of estimating the setup time of the dedicated bearer. In FIG. 2B, assume that the PoC Server 220 has estimated (using one of the techniques described above) that the dedicated bearer setup time will exceed the time allotted by KPI-1.

The PoC server 220 may then determine the amount of time, in excess of the KPI-1 timer, that will be needed for establishment of the dedicated bearer, based on the estimate setup 256 step. The PoC Server may then generate a PTT grant 272 that includes a tone duration that is at least as long as the determined amount of time. The PTT Grant may be sent to the PoC Client prior to the expiration of the KPI-1 timer. The PoC client may receive the PTT grant and begin playing out the TPT 274 for the specified time duration.

Because the tone duration was specified to be at least as long as the time to setup the dedicated bearer, the dedicated bearer 276 will be established at some point while the TPT is being played out by the PoC Client. As such, once the TPT completes playing out, the dedicated bearer has been established. Because the user will not begin to speak until the completion of the TPT playout, the user will not begin speaking until the dedicated bearer is available. Furthermore, the system is compliant with KPI-1, because the PTT Grant was sent prior to expiration of the KPI-1 timer.

In some implementations, in order to ensure that the dedicated bearer is setup prior to the user beginning to speak, the system may desire to overestimate the setup time (e.g. consider worst case setup instead of average, etc.). Overestimating the dedicated bearer setup time may provide an additional level of comfort that the dedicated bearer will be established prior to the user speaking. It should also be understood that even in the case where the estimated setup time is underestimated, it is still helpful to extend the length of the TPT playout because it results in less time that the user is speaking while transmitting over the default bearer.

Figure 3:
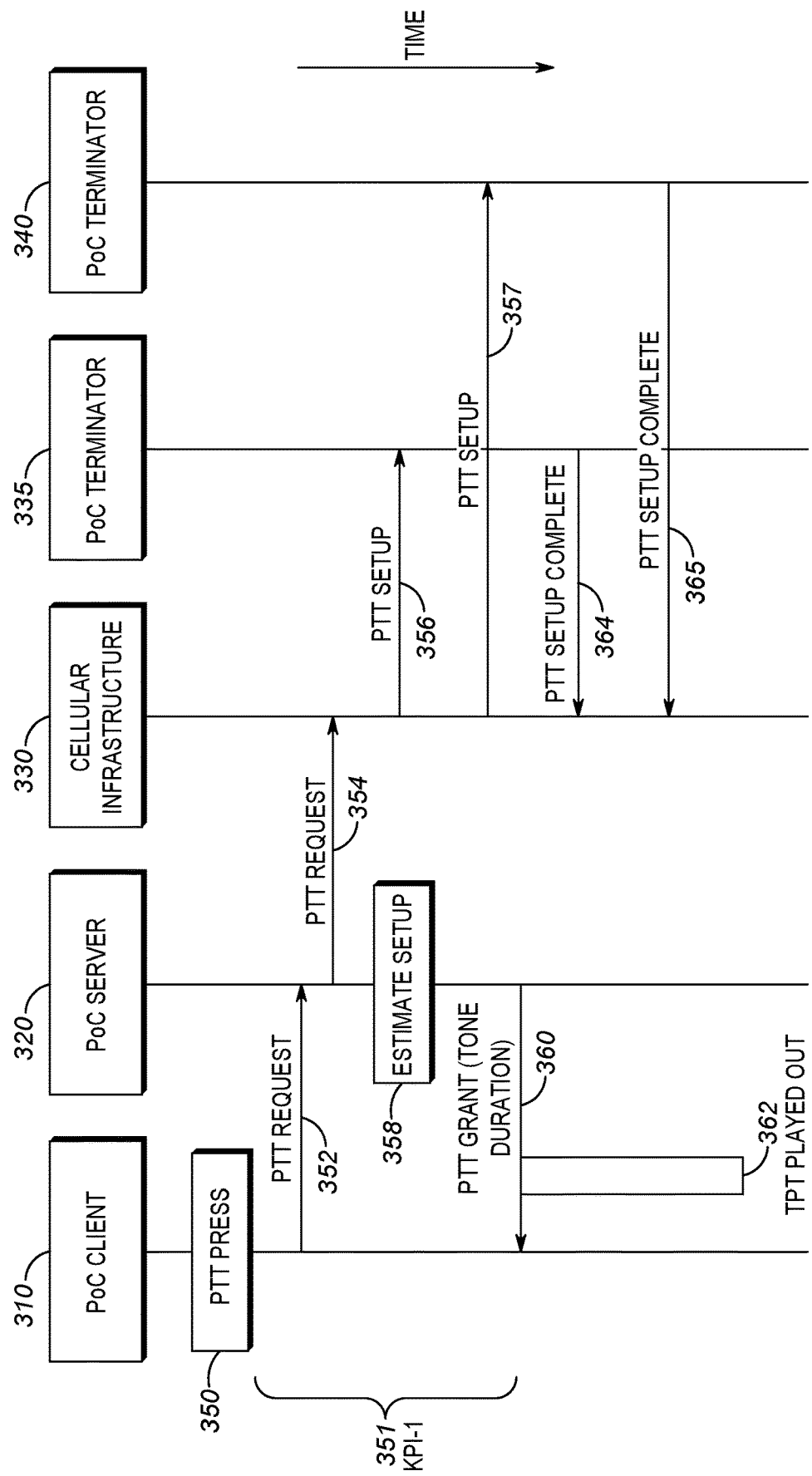
FIG. 3 is an example of a call flow diagram for varying the length of a talk permit tone based on estimated time for call termination leg setup.

FIG. 3 is an example of a call flow diagram for varying the length of a talk permit tone based on estimated time for call termination leg setup. As mentioned above, one of the 3GPP PoC requirements is that there be no audio clipping for call recipients. This effectively means that the audio generated by a caller needs to be buffered until all call termination legs have been established. The reason for this is that if audio playback begins before all call termination legs are established, those legs that joined after the audio had already begin being played would have a portion of the audio clipped, which is not allowed.

The call flow diagram in FIG. 3 includes a PoC Client 310 that originates a PTT call, a PoC server 320, and Cellular Infrastructure 330. These elements are similar to the similarly named and numbered elements in FIGS. 2A,B and for purposes of simplicity, those descriptions will not be repeated here. FIG. 3 also includes PoC terminators 335, 340. PoC terminators may be PoC devices that are included in the talk group that the PoC Client is initiating a call to. In other words, PoC Terminators are the destination for the call being made by the PoC Client 310.

In operation, just as above, the PoC client 310 may wish to initiate a group call with PoC Terminators 335, 340 and does so by pressing the PTT button 350 on the PoC Client device. A PTT Request 352 may be sent from the PoC Client to the PoC Server 320. In addition, the KPI-1 timer 351 may be started as well. The PoC Server may then send the PTT Request 354 to the cellular infrastructure 330. For ease of description, the exact messages that are exchanged are not described. The techniques described herein are not dependent on any particular mechanism for setting up the call termination legs. What should be understood is that the PoC Server requests call termination legs be setup with PoC terminators 335, 340.

The cellular infrastructure 330 may then set up the call termination legs by sending PTT Setup messages 356, 357 to PoC terminators 335, 340. Again, the specific messages used are not described because the techniques described herein are not dependent on those specific messages. What should be understood is the cellular infrastructure attempts to set up call termination legs with the PoC terminators. Setting up call termination legs may involve paging the PoC terminators over the RAN. As such, the response time may be variable based on various RAN factors (e.g. paging channel occupancy, client device discontinuous reception mode (DRX mode), etc.).

The PoC server 320 may estimate setup time 358 for all of the call termination legs. In some cases, the estimate may be based the factors described above (e.g. paging channel occupancy, DRX mode, etc.). In some cases, the estimated time for setting up the terminating call legs may be based on the total number of terminating call legs. In yet other cases, the estimated time for setting up call termination legs may be based on a historical average of setup times for call termination legs. Regardless of the mechanism used, the PoC server may estimate the amount of time required to set up all call legs.

Although not shown, in the case where the estimated call termination leg setup time is less than the KPI-1 timer, the PTT grant maybe sent as soon as all terminating call legs have been set up. Because the PTT grant was sent prior to the expiration time of the KPI-1 timer, there is no need to extend the duration of the TPT playout past the TPT playout time absent the techniques described herein.

However, if the estimated setup time 358 is greater than the KPI-1 timer 351, the PoC server 320 may determine an amount of time in excess of the KPI-1 timer that is required to setup all call termination legs. The PoC server may send a PTT Grant 360 to the PoC Client 310 that includes a tone duration based on the determined amount of excess time. The PoC server may send the PTT grant prior to the expiration of the KPI-1 timer, thus ensuring compliance with the 3GPP MCPTT standards.

The PoC Client 310 may receive the PTT grant and begin playing out the TPT for the duration specified in the PTT grant 362. Because the duration is based on the time to set up all call termination legs, by the time the TPT completes playing out, the PTT setup complete (e.g. call termination leg setup complete) 364, 365 may have been received from all PoC terminators. Because the user does not begin speaking until the TPT finishes playing out, and because all call termination legs are complete by the time the TPT finishes playing, there is no need to buffer any audio.

Even if the estimate for the call terminating leg setup is too short, the system described herein still allows the amount of audio that has to be buffered to be reduced. For example, if terminating call legs set up is expected to take 3 seconds longer than the KPI-1 timer 351, the TPT playout duration may be set to 3 seconds. However, even if the call termination leg set up takes 4 seconds, only one second of audio must be buffered (as opposed to all 4 seconds in the case where the PTT grant is sent as soon as the KPI-1 timer expires, with no extended TPT playout duration). In some implementations, the length of the TPT playout duration may be based on when the first call terminating leg completes. In such implementations, the need to buffer audio is not eliminated, but at least the amount of buffered audio is reduced.

Although FIGS. 2 and 3 have been described separately, it should be understood that this was for ease of description and not by way of limitation. An actual implementation may base the length of the TPT playout on both the amount of time to set up dedicated bearers as well as the amount of time to setup all call termination legs. For example, in one example, the longest time (e.g. dedicated bearer setup or all call termination leg setup) may be used to determine how long the TPT should be played out.

Figure 4:
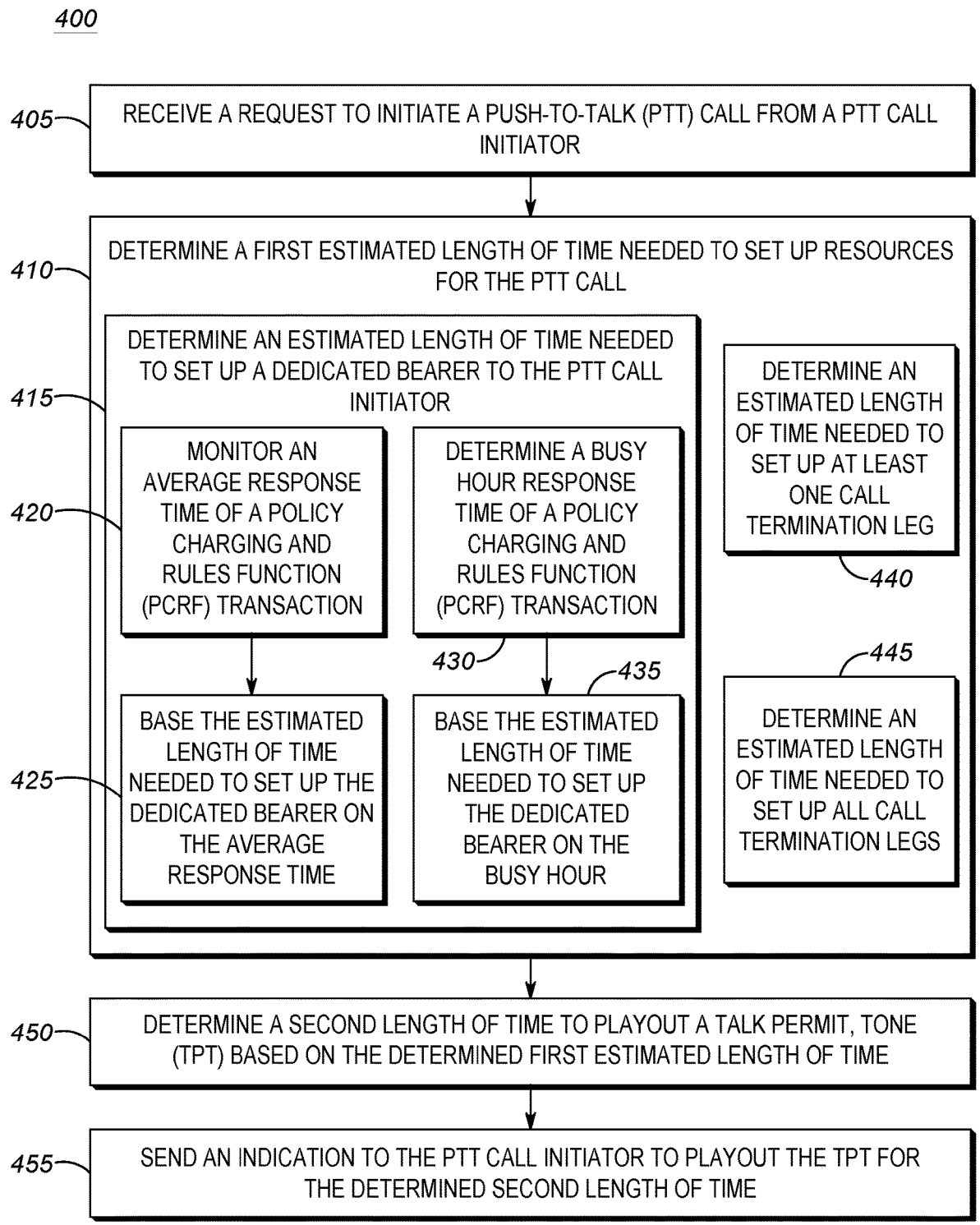
FIG. 4 is an example of a flow diagram for implementing the variable length talk permit tone techniques described herein.

FIG. 4 is an example of a flow diagram 400 for implementing the variable length talk permit tone techniques described herein. In block 405, a request to initiate a Push-to-Talk (PTT) call from a PTT call initiator may be received. For example, a user may utilize a PTT device, such as a smartphone, to initiate a PoC call that utilizes cellular infrastructure. The PTT call may be destined for one or more call recipients. Typically, the PTT call will be a two way, half duplex call, although the techniques described herein are not limited to this type of call.

In block 410, a first estimated length of time needed to setup resources for the PTT call may be determined. The first estimated length of time to setup resources for the PYTT call may be the PoC Servers estimate of the time needed to setup resources (e.g. dedicated bearers, call termination legs, etc.) that are need to allow for the PTT call to complete. Although several types of resources have been described, the techniques described herein are not limited to only those mentioned resources. What should be understood is that anything that is needed to allow a successful PTT call may be considered a resource.

In block 415, an estimated length of time needed to set up a dedicated bearer to the PTT call initiator may be determined. As described above, one of the resources that may be needed for a PTT call is a dedicated bearer with a guaranteed QoS. An estimated time to set up the dedicated bearer may be a factor when determining the first estimated time to set up resources for the PTT call.

In one example, the amount of time needed to set up a dedicated bearer is based on determining an average response time for setting up a dedicated bearer. In block 420, an average response time of a Policy Charging and Rules Function (PCRF) transaction is monitored. In an LTE system, the average response time of a PCRF transaction may be used as an indication of how long the system will take to set up a dedicated bearer, because it is the PCRF that is used to set up the dedicated bearer. It should be understood that the PCRF is utilized in an LTE system, but the techniques described herein are not limited to LTE systems. What should be understood is that the average response times of setting up the dedicated bearer may be monitored.

In block 425, the estimated length of time needed to set up the dedicated bearer may be based on the average response time. In other words, the PoC server may determine, historically, on average, how long it takes to set up the dedicated bearer. This historical average may be a good proxy for how long it will take to set up a dedicated bearer in the future. As the cellular infrastructure becomes more/less busy, the average setup time may increase/decrease. In some implementations, an additional guard time may be added to the average response time in order to account for the fact that an average is not an exact predictor of the setup time of the dedicated bearer.

In one example, the amount of time needed to set up a dedicated bearer is based on the setup time needed during the busy hour. The busy hour may be the highest expected setup time for any day or it may be the expected setup time for a given hour of the day. What should be understood is that historical data is used to determine the longest expected time for dedicated bearer setup. Using busy hour setup times alleviates the need to add a guard time when using the average time, because the busy hour setup time is the longest expected time for setup of the dedicated bearer.

In block 430, a busy hour response time of a Policy Charging and Rules Function (PCRF) transaction may be determined. As explained above, the busy hour response time is the longest expected time for the period of the day in which the PTT call is being made. In block 435, the estimated length of time needed to set up the dedicated bearer may be based on the busy hour response time. In other words, the estimated time will be the longest expected time for setup of the dedicated bearer. It should be understood that the busy hour response time for a given hour will be greater than the average response time for the same hour.

The estimated length of time needed to setup a PTT call may also be based on the amount of time needed to setup the call termination leg(s). In block 440, an estimated length of time needed to set up at least one call termination leg may be determined. As explained above, in some implementations, the PoC server may buffer audio while waiting for call termination legs to complete setup. In one example implementation, the PoC server may set the TPT playout duration such that it does not need to begin buffering audio until at least one call termination leg has completed setup.

In another example implementation, the TPT playout duration is set such that the PoC server does not need to buffer audio at all. In block 445, an estimated length of time needed to setup all call termination legs may be determined. If all call termination legs are setup within the estimated time, there is no need for the PoC server to buffer any audio, because there would be no reason to delay sending the audio to the call recipients to prevent audio clipping.

In block 450, a second length of time to playout a talk permit tone (TPT) may be determined based on the determined first estimated length of time. The first estimated length of time is based on how long it is expected for all resources needed for a PTT call to be setup up. The second length of time to playout the TPT is determined such that the TPT playout does not end until it is expected that all resources needed for the PTT call have been successfully setup.

In cases where the time to setup all needed resources exceeds the maximum period of time for sending the PTT grant, the second length of time will generally be longer than the first estimated length of time. However, in some cases, the first estimated length of time is longer than the second length of time. For example, in cases where the needed resources are estimated to be setup before the expiration of the time period to send the PTT grant, the second length of time may be shorter than the first estimated length of time because there is no need to delay receiving audio from the call originator. In other words, the TPT playout may not need to be extended beyond the duration of the TPT playout absent the teachings of the present disclosure, because the resources needed for the call have already been setup.

In block 455, an indication may be sent to the PTT call initiator to playout the TPT for the determined second length of time. By playing out the TPT for the second length of time, the call originator will not begin speaking until the resources needed for the call (e.g. dedicated bearer, call termination legs, etc.) have been setup.

Figure 5:
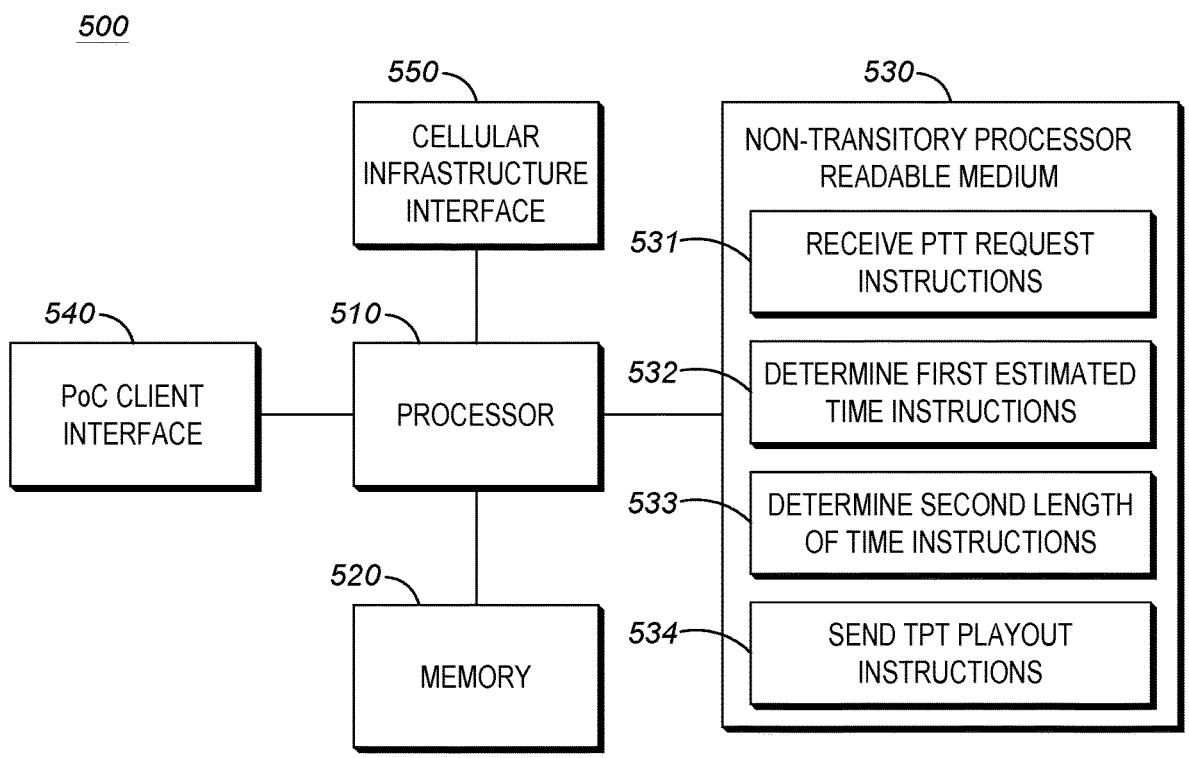
FIG. 5 is an example of a device that may implement the variable length talk permit tone techniques described herein.

FIG. 5 is an example of a device that may implement the variable length talk permit tone techniques described herein. For example, a device that may implement the PoC Server. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. dedicated bearer set up, call leg termination, etc.) could be implemented on multiple devices that are communicatively coupled. FIG. 5 is not intended to imply that all the functionality described above must be implemented on a single device. In many PoC systems, the functionality may be distributed amongst several servers.

Device 500 may include processor 510, memory 520, non-transitory processor readable medium 530, PoC client interface 540, and cellular infrastructure interface 550.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include receive PTT request instructions 531. The receive PTT request instructions may cause the processor to receive event to receive a request from a PoC client to initiate a new call. For example, the request could be to initiate a new two way, half duplex voice call with members of a talk group. The request may cause the processor to begin the process of interacting with the cellular infrastructure in order to setup the call.

The PTT request may be received over the PoC client interface 540. The PoC client interface may be any interface that allows the processor to communicate with the PoC client. In many cases this will be communications through the cellular network, however it could be over other communications channels (e.g. WiFi, Bluetooth, etc.). The functionality provided by the receive PTT request instructions is described throughout the specification, including places such as block 405.

The medium 530 may also include determine first estimated time instructions 532. The determine first estimated time instructions may cause the processor to determine an estimate of how long it may take to setup the resources (e.g. dedicated bearer, call termination legs, etc.) needed for the PTT call. When setting up the PTT call, the processor may interface with the cellular infrastructure via cellular infrastructure interface 550 to setup resources for the PTT call (e.g. dedicated bearer, call termination legs, etc.). The instructions may include keeping track of historical resource setup times for use in predicting future resource setup times. The functionality provided by the determine first estimated time instructions is described throughout the specification, including places such as blocks 410-445.

The medium 530 may also include determine second length of time instructions 533. The determine second length of time instructions may cause the processor to determine the second length of time, which may be used to determine how long the TPT playout duration should be. The second length of time may be based on the first estimated length of time. The functionality provided by the determine second length of time instructions is described throughout the specification, including places such as block 450.

The medium 530 may also include send TPT playout instructions 534. The send TPT playout instructions may cause the processor to send the PoC client a PTT grant that includes a length of time to playout the TPT (i.e. the second length of time). The processor may send the PTT grant to the PoC Client by utilizing the PoC Client interface 540. The functionality provided by the send TPT playout instructions is described throughout the specification, including places such as block 455.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. Reference to at least one of elements A and B means any number of element A alone, any number of element B alone, or any combination of any number of element A and element B. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving a request to initiate a Push-to-Talk (PTT) call from a PTT call initiator;
determining a first estimated length of time needed to set up resources for the PTT call;

determining a second length of time to playout a talk permit tone (TPT) based on the determined first estimated length of time; and
sending an indication to the PTT call initiator to playout the TPT for the determined second length of time.

2. The method of claim 1 wherein the first estimated length of time is longer than the second length of time.

3. The method of claim 1 wherein determining the first estimated length of time further comprises:
determining an estimated length of time needed to set up a dedicated bearer to the PTT call initiator.

4. The method of claim 3 wherein determining the estimated length of time needed to set up the dedicated bearer to the PTT call initiator further comprises:
monitoring an average response time of a Policy Charging and Rules Function (PCRF) transaction; and
basing the estimated length of time needed to set up the dedicated bearer on the average response time.

5. The method of claim 3 wherein determining the estimated length of time needed to set up the dedicated bearer to the PTT call initiator further comprises:
determining a busy hour response time of a Policy Charging and Rules Function (PCRF) transaction; and
basing the estimated length of time needed to set up the dedicated bearer on the busy hour response time.

6. The method of claim 1 wherein determining the first estimated length of time further comprises:
determining an estimated length of time needed to set up at least one call termination leg.

7. The method of claim 1 wherein determining the first estimated length of time further comprises:
determining an estimated length of time needed to set up all call termination legs.

8. A system comprising:
a processor; and
a memory coupled to the processor, the memory containing a set of instructions thereon that when executed by the processor cause the processor to:
receive a request to initiate a Push-to-Talk (PTT) call from a PTT call initiator;
determine a first estimated length of time needed to set up resources for the PTT call;
determine a second length of time to playout a talk permit tone (TPT) based on the determined first estimated length of time; and
send an indication to the PTT call initiator to playout the TPT for the determined second length of time.

9. The system of claim 8 wherein the first estimated length of time is longer than the second length of time.

10. The system of claim 8 wherein the instructions to determine the first estimated length of time further comprises instructions to:
determine an estimated length of time needed to set up a dedicated bearer to the PTT call initiator.

11. The system of claim 10 wherein the instructions to determine the estimated length of time needed to set up the dedicated bearer to the PTT call initiator further comprises instructions to:
monitor an average response time of a Policy Charging and Rules Function (PCRF) transaction; and
base the estimated length of time needed to set up the dedicated bearer on the average response time.

12. The system of claim 10 wherein the instructions to determine the estimated length of time needed to set up the dedicated bearer to the PTT call initiator further comprises instructions to:
determine a busy hour response time of a Policy Charging and Rules Function (PCRF) transaction; and
base the estimated length of time needed to set up the dedicated bearer on the busy hour response time.

13. The system of claim 8 wherein the instructions to determine the first estimated length of time further comprises instructions to:
determine an estimated length of time needed to set up at least one call termination leg.

14. The system of claim 8 wherein the instructions to determine the first estimated length of time further comprises instructions to:
determine an estimated length of time needed to set up all call termination legs.

15. A non-transitory processor readable medium containing a set of instructions thereon that when executed by a processor cause the processor to:
receive a request to initiate a Push-to-Talk (PTT) call from a PTT call initiator;
determine a first estimated length of time needed to set up resources for the PTT call;
determine a second length of time to playout a talk permit tone (TPT) based on the determined first estimated length of time; and
send an indication to the PTT call initiator to playout the TPT for the determined second length of time.

16. The medium of claim 15 wherein the instructions to determine the first estimated length of time further comprises instructions to:
determine an estimated length of time needed to set up a dedicated bearer to the PTT call initiator.

17. The medium of claim 16 wherein the instructions to determine the estimated length of time needed to set up the dedicated bearer to the PTT call initiator further comprises instructions to:
monitor an average response time of a Policy Charging and Rules Function (PCRF) transaction; and
base the estimated length of time needed to set up the dedicated bearer on the average response time.

18. The medium of claim 16 wherein the instructions to determine the estimated length of time needed to set up the dedicated bearer to the PTT call initiator further comprises instructions to:
determine a busy hour response time of a Policy Charging and Rules Function (PCRF) transaction; and
base the estimated length of time needed to set up the dedicated bearer on the busy hour response time.

19. The medium of claim 15 wherein the instructions to determine the first estimated length of time further comprises instructions to:
determine an estimated length of time needed to set up at least one call termination leg.

20. The medium of claim 15 wherein the instructions to determine the first estimated length of time further comprises instructions to:
determine an estimated length of time needed to set up all call termination legs.

* * * * *